United States Patent [19]
Tao

[11] Patent Number: 5,392,642
[45] Date of Patent: Feb. 28, 1995

[54] SYSTEM FOR DETECTION OF LOW POWER IN AT LEAST ONE CYLINDER OF A MULTI-CYLINDER ENGINE

[75] Inventor: Xuefeng T. Tao, Columbus, Ind.

[73] Assignee: Cummins Engine Company, Inc., Columbus, Ind.

[21] Appl. No.: 84,071

[22] Filed: Jun. 30, 1993

[51] Int. Cl.⁶ .......................................... G01M 15/00
[52] U.S. Cl. ................................................ 73/117.3
[58] Field of Search .................... 73/35, 116, 117.3; 364/431.08; 123/425, 676

[56] References Cited

U.S. PATENT DOCUMENTS

| | | | |
|---|---|---|---|
| 3,393,557 | 7/1968 | Brown et al. | 73/116 |
| 4,083,234 | 4/1978 | Aono et al. | 73/116 |
| 4,370,884 | 2/1983 | Woss et al. | 73/117.3 |
| 4,586,369 | 5/1986 | Vogler | 73/117.3 |
| 4,895,121 | 6/1990 | McCoy et al. | |
| 5,119,783 | 6/1992 | Komurasaki | |
| 5,144,929 | 9/1992 | Hosoya et al. | |

FOREIGN PATENT DOCUMENTS

| | | | |
|---|---|---|---|
| 124928 | 5/1991 | Japan | 123/425 |
| 504509 | 4/1939 | United Kingdom | 73/35 |
| 9002871 | 3/1990 | WIPO | 123/425 |

*Primary Examiner*—Robert Raevis
*Attorney, Agent, or Firm*—Sixbey, Friedman, Leedom & Ferguson

[57] ABSTRACT

Vibration sensors are used to monitor the resonant frequency of each cylinder of a multi-cylinder engine and the detection of an abnormal resonant frequency, i.e., one outside of an established range, is used as an indication that one or more specific cylinders is operating at an improper power level. Vibration signals associated with combustion in each cylinder can be used to perform FFT (Fast Fourier Transformation) with the combustion resonant frequencies for all engine cycles being determined and an averaged resonant frequency for each cylinder obtained. Shifts in the averaged resonant frequency or the detection of a zero resonant frequency for only one of the cylinders can be used as an indication that the cylinder with the shifted or zero resonant frequency is experiencing a low power condition, including misfiring.

19 Claims, 8 Drawing Sheets

SYSTEM FOR DETECTION OF LOW POWER IN AT LEAST ONE CYLINDER OF A MULTI-CYLINDER ENGINE

BACKGROUND OF THE INVENTION

1. Field of the Invention

The present invention relates to the field of combustion engine diagnostics. More specifically, the present invention is directed to methods and apparatus by which the performance of the combustion process in individual cylinders of a multi-cylinder engine can be monitored and low power level conditions detected.

2. Description of Related Art

The cylinder pressure resonance phenomenon is well known and understood. Furthermore, as reflected by U.S. Pat. Nos. 4,895,121 (McCoy et al.), 5,119,783 (Komurasaki) and 5,144,929 (Hosoya et al.), this phenomenon is used in methods and apparatus for controlling engine operation for suppressing the occurrence of autoignition, i.e., knocking. In accordance with these disclosures, vibration sensors are used to monitor engine cylinder resonant frequencies produced during operation of a multi-cylinder engine, and the magnitude of the resonance frequency peaks are evaluated as a knocking indicator. The frequency range in which the resonant frequency occurs is not taken into consideration and the only abnormal combustion condition detected is knocking, except for Komurasaki which also detects misfiring.

Additionally, in "Ein nuer Klopdetektor für Ottomoteren, Ein neues, empfindlicheres Verfahren zur Detektion yon Klopfen bei Ottomotoren" [A New Knock Detector for Spark-Ignition Engines, a new more sensitive method of detecting knock in spark-ignition engines], N. Härle and J. F. Böhme, *Automobil-Industrie*, January, 1990, describes a more accurate manner of determining the existence of engine knocking using a microprocessor to perform complex vibration signal processing tasks including signal transformation, weighting, etc. By the described techniques, it is indicated that greater sensitivity can be obtained for determining that a detected level of resonance energy has exceeded a predetermined threshold indicative of knocking while minimizing the probability of a false indication of knocking being issued.

Tests for the identification of low power cylinders in multi-cylinder engines which are not dependent on the detection of knocking are known. However, these tests can only be performed during engine idling condition through the use of cylinder cut-out techniques. Thus, such tests are not suitable for an on-board vehicle diagnostic system, and cannot be used to perform diagnostic tests under on-the-road driving conditions.

SUMMARY OF THE INVENTION

A primary object of the invention is to provide a diagnostic system for internal combustion engines by which the performance of individual cylinders of a multi-cylinder engine can be monitored and low power conditions, including misfiring, identified.

It is a further object to obtain the preceding object in a manner that is not restricted to testing during idling and which can be utilized during on-the-road driving.

In furtherance of the preceding objects, it is a more specific object of this invention to utilize the discovery of a relationship between resonant frequency of the charge in an engine cylinder and combustion performance to determine when a low power condition exists in an engine cylinder.

Yet another object of the present invention is to create single cylinder diagnostics which will detect a low power condition in response to the resonant frequency occurring outside of a given frequency range.

Another object of this invention is to provide a method and apparatus for detecting engine performance deficiencies that are not limited to the occurrence of knocking.

A further object of the present invention is to achieve the foregoing objects by adaptation of existing monitoring technology.

In accordance with preferred embodiments of the present invention, these objects and others are achieved by using a vibration sensor to monitor the resonant frequency of each cylinder of a multi-cylinder engine and using the detection of an abnormal resonant frequency, i.e., one outside of an established range, as an indication that one or more specific cylinders is operating at an improper power level. Vibration signals associated with combustion in each cylinder can be used to perform FFT (Fast Fourier Transformation) with the resonant frequencies (combustion resonant frequencies) for all engine cycles being determined and an averaged resonant frequency for each cylinder obtained. Shifts in the averaged resonant frequency or the detection of no resonance for only one of the cylinders can be used as an indication that the cylinder with the shifted resonant frequency or no resonance is experiencing a low power condition, including misfiring.

In accordance with one preferred embodiment, self-diagnostics can be conducted to determine failed sensors by using redundant information provided by each vibration sensor. For instance, a pair of sensors may measure the same engine event (e.g., valve closing for a particular cylinder) and the portion of their vibration signals corresponding to the event compared.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

The present invention utilizes the discovery of a relationship between resonant frequency (i.e., the dominant frequency in the frequency spectrum of the vibrations associated with the combustion process of an engine) and combustion performance to determine when a low power condition exists in an engine cylinder. Cylinder pressure resonance is a well known and understood phenomenon, i.e., that the resonant frequency of the vibrations produced by the combustion process in the combustion chambers of an internal combustion engine varies directly with the speed of sound and inversely with respect to the bore size (diameter) of the combustion chamber. Analysis of the variables affecting the speed of sound yields combustion chamber temperature as the primary factor affecting the speed of sound, and thus, the resonant frequency, and cylinder temperature varies during engine operation, due to such factors as engine speed and load. However, it is also known that, even though resonant frequency will vary, it will normally lie in a range of about 2.5 KHz to 7.5 KHz dependent on the cylinder bore (e.g. for a cylinder bore of 6.25", a resonant frequency of about 2.5–4.0 KHz can be expected).

Figure 1:
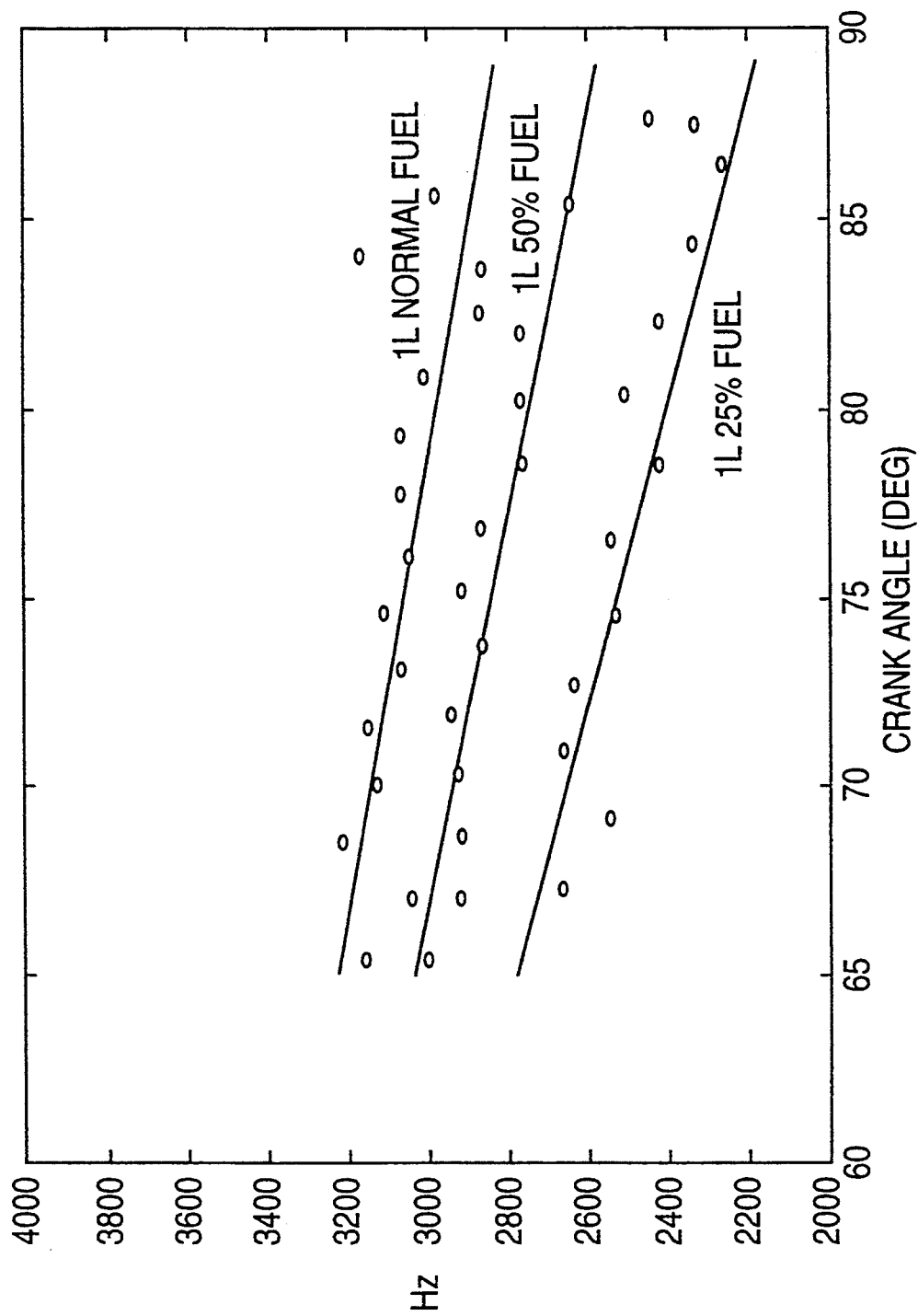
FIG. 1 is a graph depicting the resonant frequency of signals from a vibration sensor as a function of crank angle at different power levels.
Figure 5:
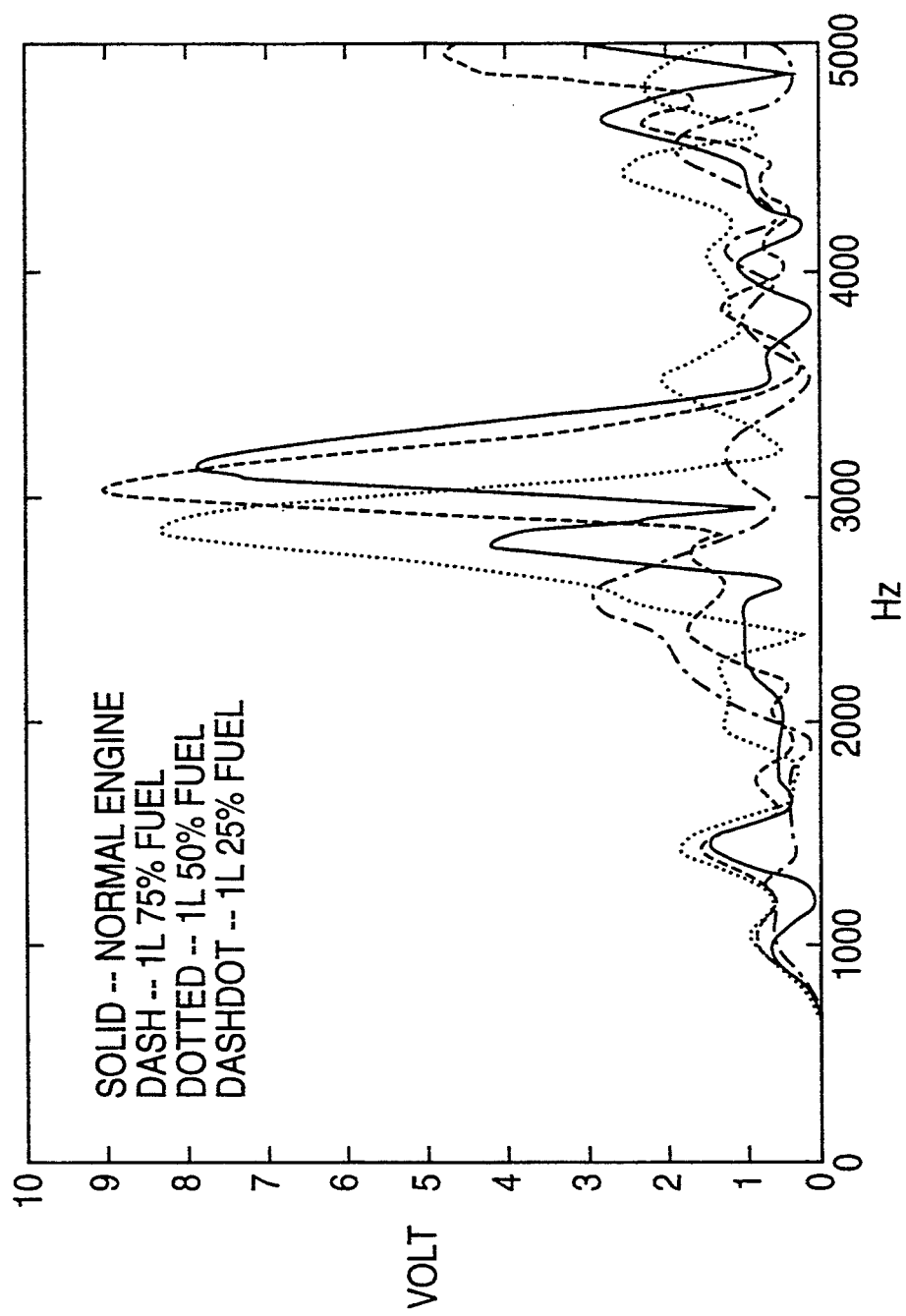
FIG. 5 is a graph depicting the frequency spectrum of signals from a sensor mounted on a cylinder valve cover under different levels of fueling.

From this point, by analyzing the effects of temperature changes due to the expansion process in the engine cylinder, the present inventor confirmed that resonant frequency should change with engine crank angle (see, e.g., N. Härle and J. F. Böhme, above, where the fact that resonant frequency changes with engine crank angle is commented upon). FIG. 1 shows experimental results depicting the resonant frequency of signals from a vibration sensor as a function of crank angle under different levels of power as simulated by reducing the fuel rate to the injector to 75%, 50% and 25% of the normal fueling rate. As can be seen, the resonant frequency decreases as the combustion process proceeds to the end. Furthermore, a resonant frequency shift can be observed as a function of the level of power, i.e., as the fuel rate decreases (and with it the power level), the resonant frequency of the cylinder shifts to a lower frequency. These results were confirmed with tests in which the engine was operated at several different load levels, as can be seen from FIG. 5 where this frequency shift is reflected in a spectrum analysis of cylinder vibrations detected in a manner described in greater detail below.

It is the discovery of this resonant frequency shift as a function of the level of power produced upon which the present invention is based. Furthermore, using cylinder peak pressure rise measurements, a relationship between the resonant frequency detected and the power level produced has been established which enables the power level in each cylinder to be determined if the resonant frequency of each cylinder of a multi-cylinder engine can be practically measured. In this regard, it is noted that, while peak pressure rise measurements are useable to establish power levels occurring in an engine cylinder under test conditions, such is not practical for on-the-road use. For example, cylinder pressure sensors are too sensitive (both thermally and mechanically) and would not withstand prolonged engine operation.

For purposes of measuring the resonant frequency of each cylinder of a multi-cylinder engine conventional "knock" sensors, such as piezoelectric vibration sensors, can be used. Such sensors, while subject to a lack of consistency in sensitivity, are acceptable for the present purposes due to the fact that it is the frequency at which the resonant frequency peak occurs that is important to the present invention and the magnitude of the resonant frequency peak need only be determined to have exceeded a minimum threshold level to be recognized as such. In addition, piezoelectric vibration sensors are low in cost, reliable and durable in comparison to other accelerometer-type vibration sensors.

Knock sensors are primary of two types: resonant and nonresonant types. Even though both of these types are suitable for knock detection, for the purposes of the present invention, nonresonant types are preferred (despite the fact that they produce a lower output). In particular, nonresonant types of knock sensors are suitable because they provide a roughly constant sensitivity in a certain frequency range and can be used regardless of engine model. On the other hand, resonant types must be adjusted for each different engine model, and more importantly, it is difficult to obtain consistently accurate resonance measurements with this type of sensor due to difficulties associated with trying to distinguish the resonance of the sensor from that associated with the combustion process.

Figure 2:
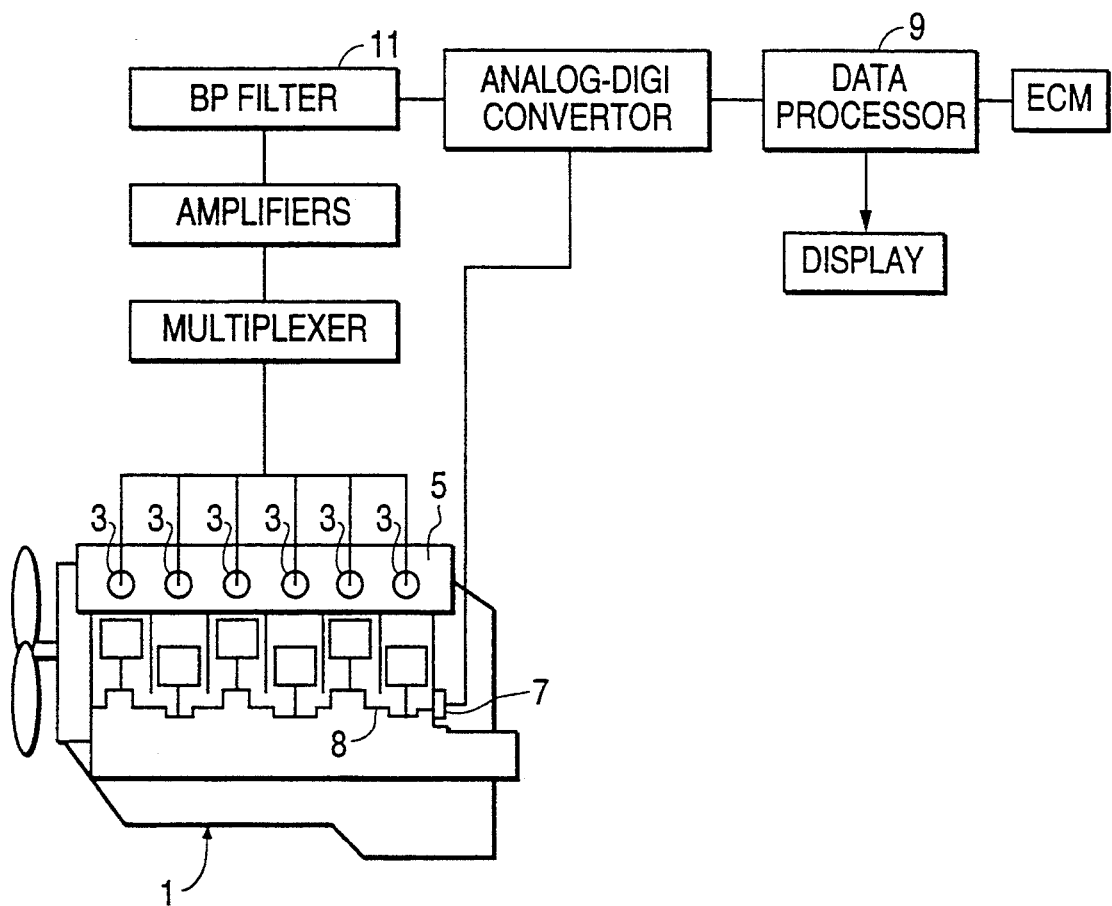
FIG. 2 is a diagrammatic depiction of an engine with the low power detection apparatus in accordance with a preferred embodiment of the present invention.
Figure 3:
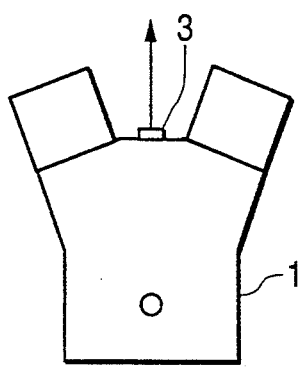
FIG. 3 is a schematic representation of an engine showing an alternative location for placement of vibration sensors of the FIG. 1 apparatus.

Sensor locations should be selected which are at places on the engine which are sensitive to combustion forces, and if possible, not sensitive to other engine forces. FIG. 2 shows an engine 1 with the low power detection apparatus in accordance with a preferred embodiment of the present invention in which vibration sensors 3 are mounted on a valve housing cover 5 in proximity to each engine cylinder. As an alternative, the sensors 3 can be mounted to the cylinder block between two adjacent head assemblies at each pair of cylinders, as diagrammatically represented in FIG. 3. However, it should be recognized that what will be suitable sensor mounting locations will vary from engine to engine and the primary factor governing selection is that they be sensitive to combustion forces and at least relatively insensitive to other engine forces, with other factors, such as accessibility, being considered as well.

Even with careful selection of the sensor locations on the engine 1, the sensors 3 will still pick up structural vibrations due to other internal forces. To isolate the combustion-related engine vibrations, time domain windowing based on crank angle can be used to effectively separate engine events that do not overlap the combustion event, such as intake and exhaust valve closings. This can be achieved by using a crank shaft angle indicator 7, such as a crank shaft timing encoder or a magnetic pickup which produces a pulse once each rotation of the crank shaft 8, to confine the signals from the sensors 3 which are to be processed by data processor 9 to only those obtained during a specific crank angle interval, e.g., from top dead center (TDC) to 30° after top dead center (ATDC) during each power stroke. Advantageously, a window, known as a Hamming window, that tapers smoothly to zero at each end (analogous to a bell-shaped curve) is used to eliminate abrupt discontinuities at the beginning and end of a windowed series.

Additionally, since, as noted above, resonant frequencies for a given engine usually occur within a relatively defined frequency range, a bandpass filter 11 can be used to further separate the combustion-related vibration from that associated with other engine events. For example, for an engine having a 6.25" bore, a bandpass filter 11 can be used which will only pass vibrations in the range from 2.0 KHz to 4.5 KHz.

To enable processing of the data obtained from the sensors 3, their analog output is converted to digital signals by an A/D convertor prior to processing in the data processor 9. Various techniques are known by which digital data signals can be analyzed to determine resonant frequency. Among these known techniques are Fast Fourier Transformation (FFT), and Maximum Likelihood Estimation (MLE). FFT analysis produces inadequate frequency resolution since engine combustion is inherently a short-time process. MLE for a sinusoidal parameter estimation achieves satisfactory frequency resolution; however, implementation of the MLE method would exert a heavy computational burden on the CPU performing the data processing due to its requirement of a step of searching for a frequency in a frequency range which will maximize an estimation relationship; known as a periodogram, that is in terms of the parameters of frequency, amplitude and phase.

As a result, an efficient and sufficiently accurate computational method was needed to achieve a practical system for an on-board vehicle unit. To this end, the present inventor investigated the idea of a parabolic curve interpolation between the FFT frequency points in the frequency domain (FFT with parabolic firing). The FFT with parabolic fitting developed involved the steps of:

1) performing FFT on the windowed data over a combustion interval;
2) check for the existence of resonance and only if resonance exists, continue;
3) identify the frequency at which the maximum magnitude occurs from the FFT result;
4) select the frequency point at which the/maximum magnitude frequency occurs and a frequency point at each side of it;
5) conduct parabolic curve fitting through the three selected points in the frequency domain (three points determine a unique parabolic function); and
6) find the maximum magnitude of the obtained parabolic function, and designate the frequency at which it occurs as the estimated resonant frequency.

Figure 4:
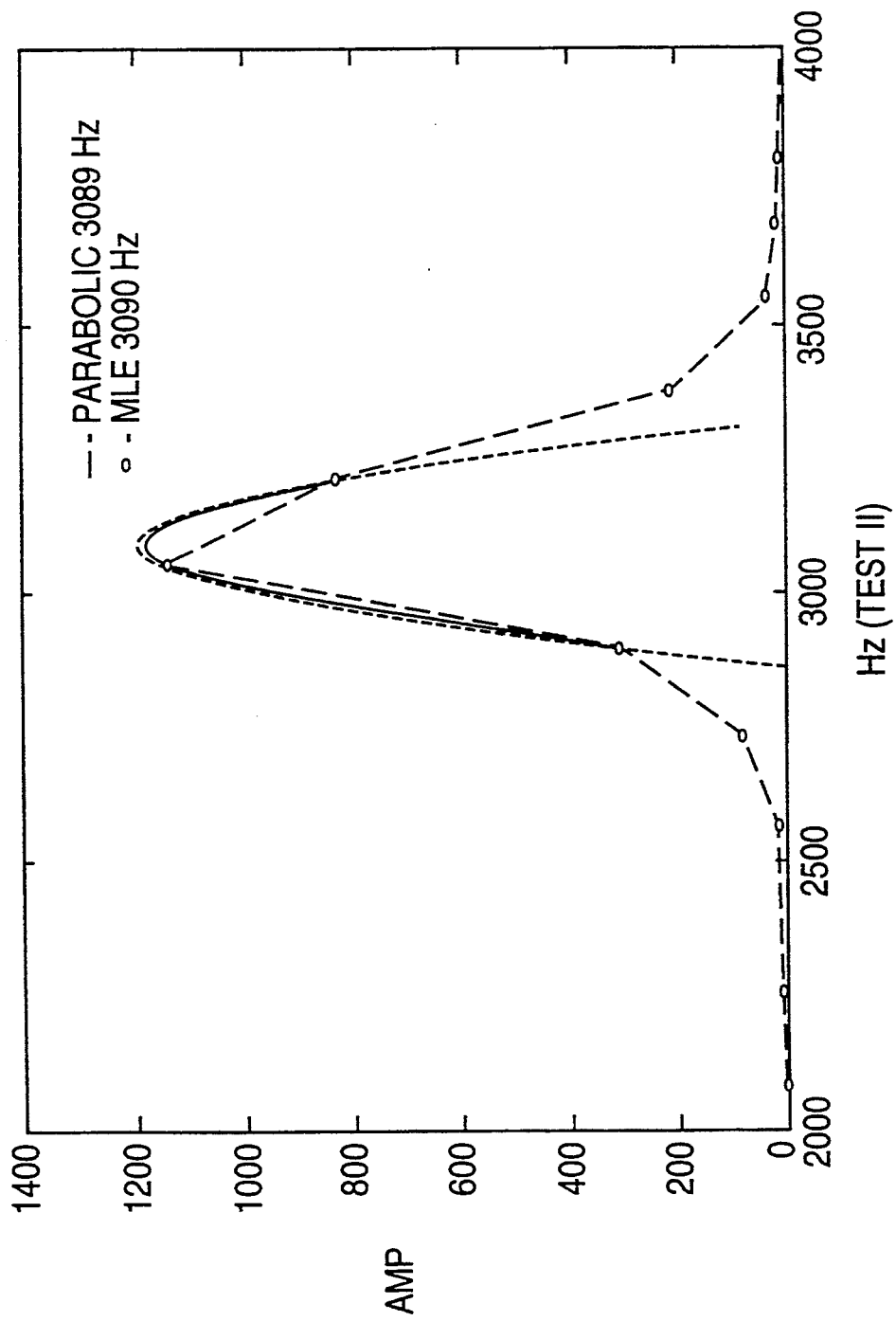
FIG. 4 is a graph depicting the results of three different resonant frequency estimation techniques.

FIG. 4 shows a comparison between one example of the results of FFT, MLE and FFT with parabolic firing frequency estimation methods, from which it can be seen that the parabolic curve firing method provides results which are comparable with those obtained with the MLE technique. Thus, due to the greater efficiency of the parabolic curve fitting method, it has been adopted as the preferred-method for resonant frequency estimation based upon sensor signal measurements obtained utilizing knock sensor arrangements in accordance with the present invention.

However, due to uncertainty and complexity in the combustion process, an engine combustion cycle is a somewhat random process, and knocking or other resonant combustion does not occur in every engine cycle. Furthermore, it is impossible to predict in which engine cycles resonant combustion will occur. Thus, to effectively reduce the effects of the uncertainties of the engine combustion cycle on the estimated resonant frequencies, it is essential that a statistical analysis of multi-cycle measurements be used.

Figure 6:
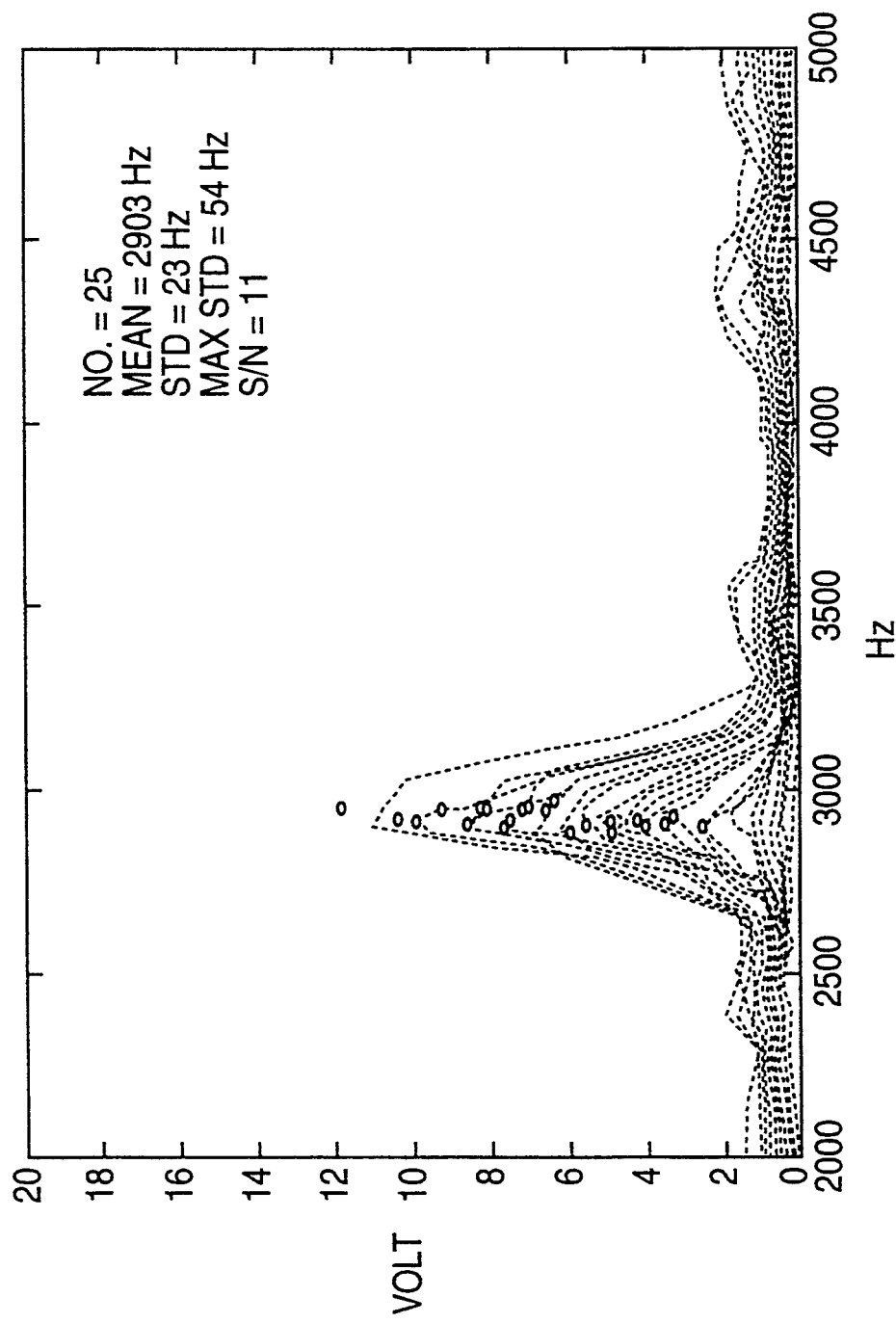
FIG. 6 is a graph similar to that of FIG. 4 but depicting the frequency spectrum of signals from a sensor for each of 48 cycles under steady-state conditions.

In order to use multi-cycle data, in accordance with the present invention, resonant combustion cycles are distinguished from nonresonant combustion cycles, the resonant frequency of each cylinder is estimated for each resonant combustion cycle, a statistical analysis of the estimated resonant frequency is performed for each engine cylinder, and the mean of these frequencies determined and used for the final estimated resonant frequency for the respective engine cylinder. With reference to FIG. 6, the frequency spectrum of signals from a sensor for each of 48 cycles, of an engine operating under steady-state conditions, can be seen with the resonant frequency estimated and denoted by a "o". In this example, 25 of the 48 cycles monitored were resonant combustion cycles, and the rest were nonresonant combustion cycles, and the mean of the estimated resonant frequencies of this particular cylinder determined to be 2903 Hz with a standard deviation of 23 Hz. Had the engine been accelerating or decelerating at the time of the measurements, the resonant frequency points "o" would have produced a slope to the fight or left instead of being essentially vertically aligned.

Figure 7:
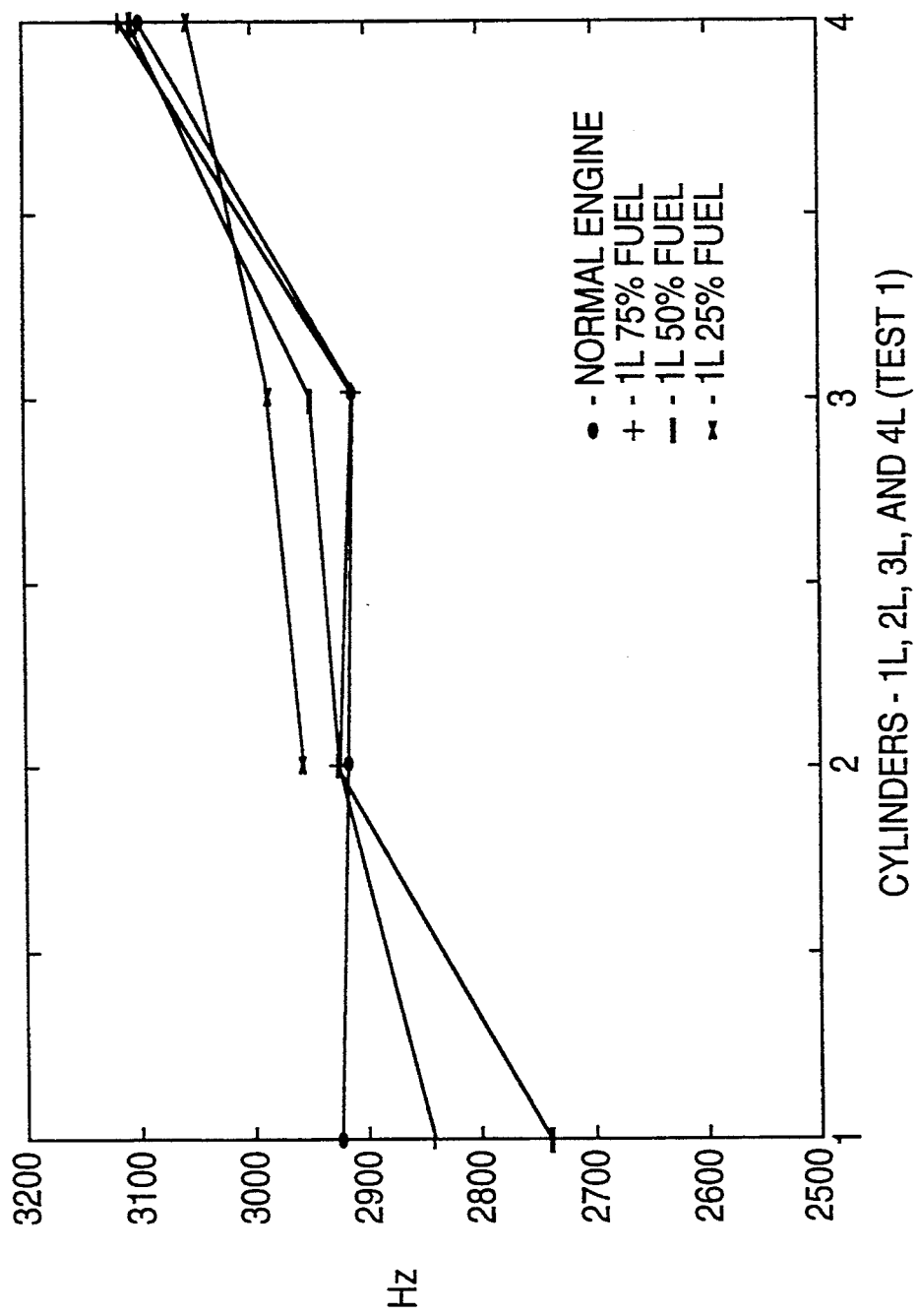
FIG. 7 is a graph depicting the resonant frequency distribution for four cylinders of an engine when the first cylinder is operated at normal and three reduced power levels.

By applying this technique to each of the cylinders of a multi-cylinder engine, a resonant frequency distribution over all of the cylinders can be obtained, and from which individual low power cylinders can be identified by the fact that low power cylinders will have a significantly lower resonant frequencies and misfiring cylinders will have no resonance detected. FIG. 7 shows the resonant frequency distribution for four engine cylinders where cylinder 1 is operated at normal and three reduced power levels while the other three monitored cylinders were operated at normal power levels. As can be seen, cylinder 1 evidences a substantially reduced resonant frequency when operated at a 50% power level and no resonant frequency when operated at a 25% of the normal power level. These results have been confirmed from data obtained of the cylinder pressure rise distribution and on other engines.

It is noted that the mere lack of a resonance frequency being detected is not determinative of the existence of low power in a given cylinder since it could be an indication that the combustion process is very smooth (a condition which can occur when the engine is being run at high speed conditions) or that the magnitude of the resonance may have been too small to be detected given the sensitivity or lack of consistency of the respective sensor 3 (i.e., resonance magnitude is not related to power level, only the smoothness of combustion, as reflected by the wide range of magnitudes reflected in FIG. 6). It is for this reason that, a statistically significant number of engine cycles (which should not be too large, in recognition of the fact that engine operating conditions can change significantly in a short period of time; e.g., about a 10 second sampling window when the engine is idling, with proportionally shorter sampling windows as engine rpms increase, being suitable) must be used to determine the resonant frequency of each cylinder, and the resonant frequency of a given cylinder must be compared with the frequency distribution of the other cylinders (e.g., the failure to detect a resonant frequency for a given cylinder would not be significant if a similar result was found for all or most of the cylinders since that would indicate a smooth running engine, not a misfiring cylinder). Also, given normal engine cylinder-to-cylinder variations (a power loss of 10-20% being insignificant and within the range of normal engine variations), from a practical standpoint, a power loss of less than 30% cannot be accurately detected.

Figure 8A:
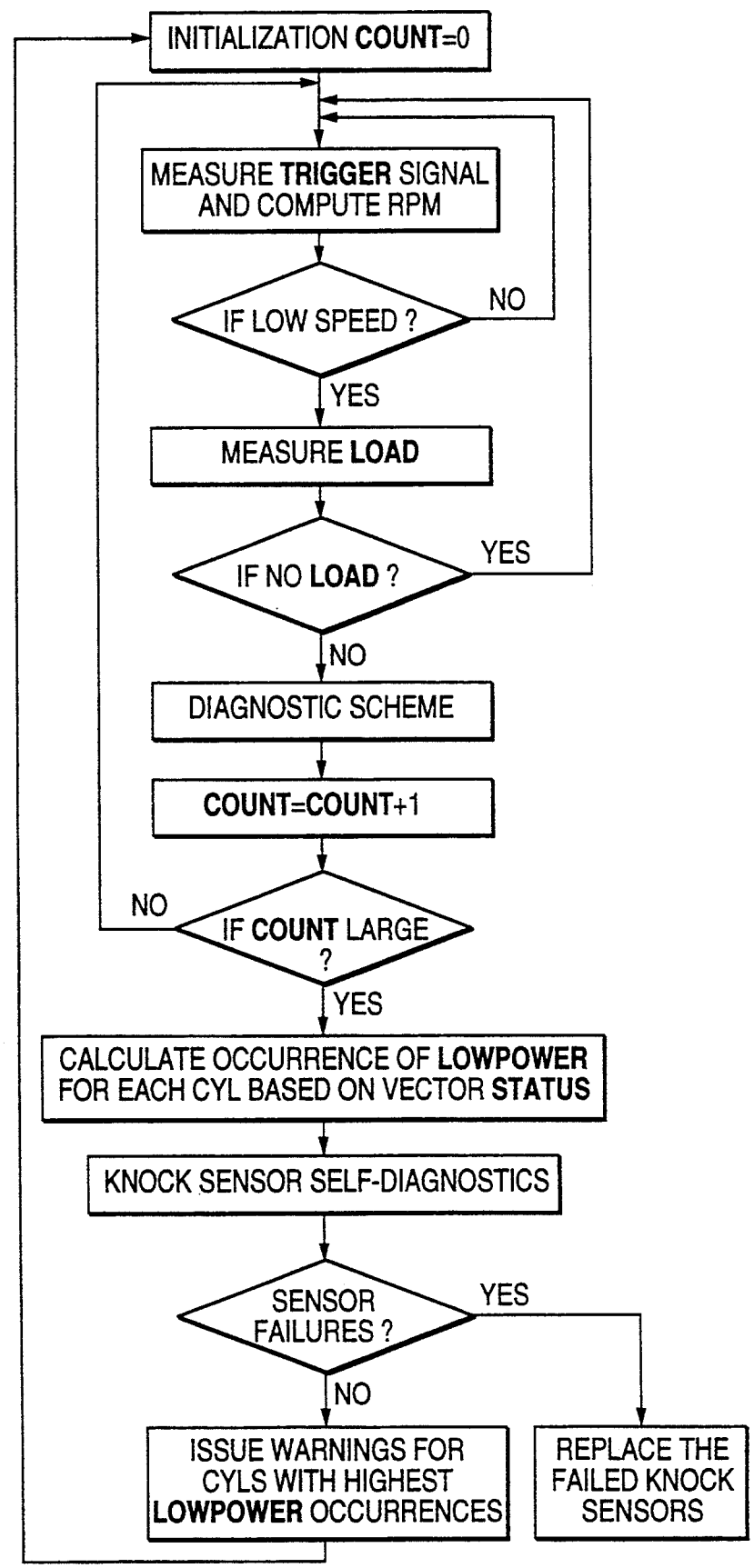
FIG. 8a is a block diagram of the diagnostic steps performed in data processor in accordance with the present invention.
Figure 8B:
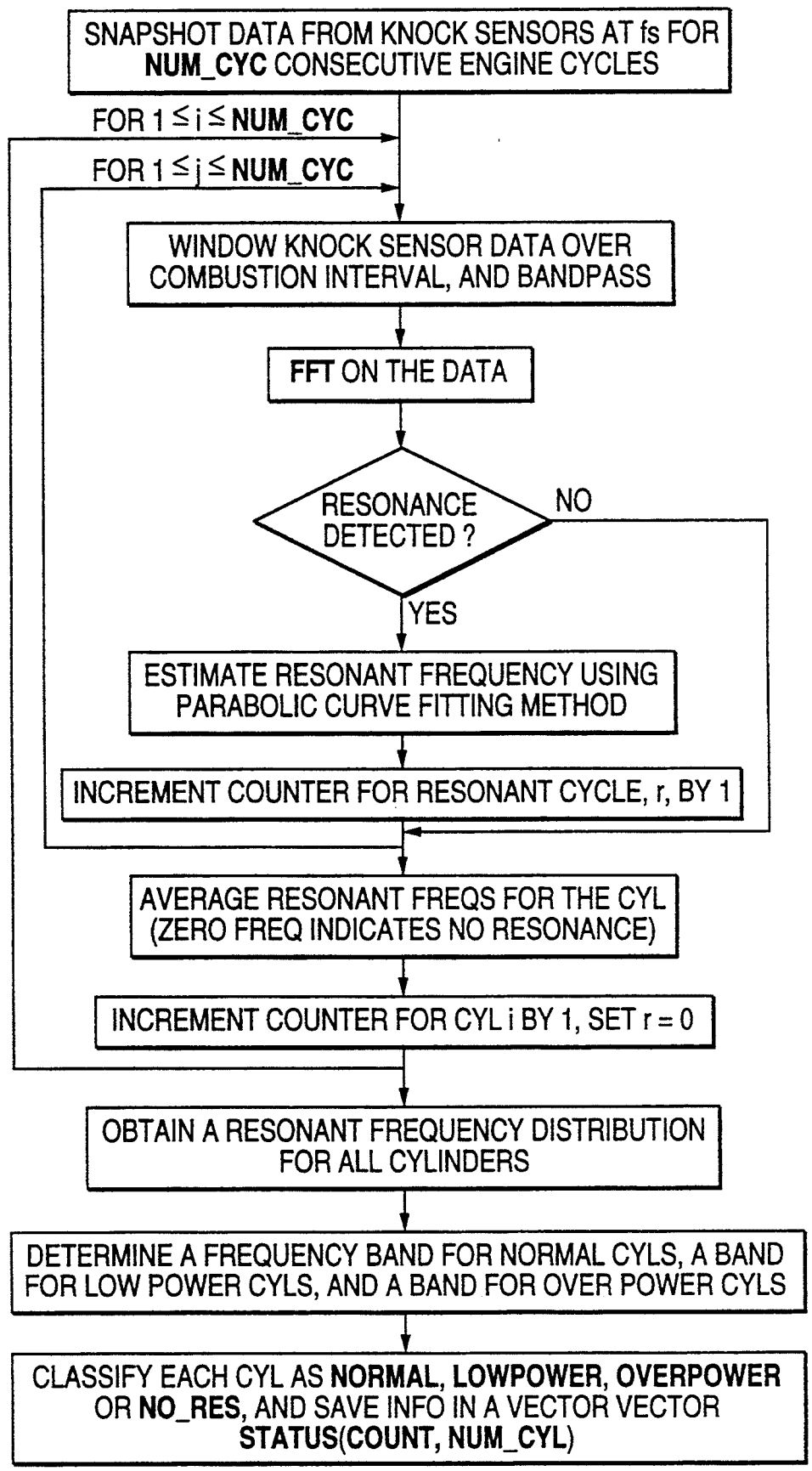
FIG. 8b is a diagnostic subroutine of the FIG. 8a diagram.

With reference to FIGS. 8a & 8b, an example of the steps performed by data processor 9 to detect the power level performance of the individual cylinders of a multi-cylinder engine on the basis of vibrations detected by the vibration sensors 3 will, now, be described. At initiation of the single cylinder power loss diagnostics, the combustion cycle count is set at j=0, and engine speed and engine load determined. The engine speed can be determined from a once-per-revolution pulse signal issued by a magnetic pickup sensor 7 each time TDC for a cylinder occurs. Engine load, optionally, can be based on an engine load signal from the engine's electronic control module (ECM) or a throttle position sensor if the engine is not equipped with an ECM. For example, in the case of a known Cummins 16 cylinder V-type engine, if the engine is operating at high speed or no load conditions, the diagnostic scheme is not performed since combustion is likely to be occurring too smoothly for a reasonable degree of accuracy to be obtainable; preferably, the engine should be operating at relatively low speed with a light to medium load to assure the highest degree of accuracy.

Assuming that favorable speed and load conditions are found to exist, the diagnostic scheme of FIG. 8b is commenced. First, the data processor examines a snapshot of data from the vibration sensors 3 taken at a sampling rate fs of, e.g., about 10,000 Hz for a sufficient number of consecutive engine cycles, NUM_CYC, e.g., 40-50 cycles. This data is windowed over, e.g., from TDC to 30° ATDC of each power stroke and bandpassed, e.g., at about 2,000-4,500 Hz, after which FFT is performed on the data. If resonance is detected, the resonant cycle count r is incremented by 1 and parabolic fitting is performed, as described above. If no resonance is detected during any cycle, a zero resonant frequency is set. Then, after the data for the prescribed number of cycles has been processed (j=NUM_CYC), a resonant frequency is obtained for the cylinder i by averaging the resonant frequencies from the r resonant combustion cycles. Once the resonant frequency is obtained for all of the engine cylinders (i=NUM_CYL), a resonant frequency distribution over all of the cylinders is obtained, from which a frequency band for normal cylinders, a frequency band for low power cylinders, and optionally, a frequency band for overpower cylinders are determined. Based on these frequency bands, the power level of each cylinder is then classified and saved in a STATUS vector which is composed of the classified power level flag (a NO_RES status being assigned when no resonance is detected in a cylinder), having a count number corresponding to how many times this diagnostic scheme has been performed as, for example, rows and the number of the particular cylinder to which the power level classification pertains as, for example, columns.

Each time the described diagnostic scheme is completed, the count number is incremented by 1 and once the count reaches a preset number that is large enough to provide sufficient accuracy, the number of occurrences of low power level indications is determined for each cylinder from the STATUS vectors and LOW-POWER warnings are output to a visual display for those cylinders having the highest number of low power occurrences or any cylinder having more than a prescribed number or percentage of low power STATUS vectors.

Preferably, as represented in FIG. 8a, before a warning indication is displayed, to prevent false alarms due to sensor failures, self-diagnostics are performed on the sensors, with a replace sensor indication being issued, instead, if a failed sensor is detected. Sensor failure diagnostics can be performed by using redundant information provided by each sensor 3. For example, two sensors may measure the same event in their vibration signals, such as intake/exhaust valve closings, and by examining the portion of the signals corresponding to the jointly-monitored event, failed sensors and even sensor-to-sensor variations can be determined.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

Industrial Utility

The present invention will find a wide range of application to single cylinder power loss diagnostics for multi-cylinder internal combustion engines, being applicable to both Diesel and spark ignition engines. The inventive diagnostic system will find particular utility as an on-board, vehicle diagnostics for engines ranging from 4 cylinder to 16 cylinder engines. The invention will significantly reduce the time required to locate low power cylinders in service as well as cosily total downtime.

I claim:

1. System for detection of low power in at least one cylinder of a multi-cylinder engine having a plurality of individual cylinders, comprising:

vibration sensing means for detecting of vibration occurring during combustion in each of the individual cylinders of a multi-cylinder engine and producing output signals corresponding to the amplitude and frequency thereof, signal conditioning means for limiting the output signals to a predetermined frequency range and from a defined portion of individual engine combustion cycles, means for detecting the existence of resonant frequency peaks occurring in the individual engine cylinders during each of a prescribed number of consecutive engine cycles, estimating means for estimating the frequency of any resonant frequency peak detected in said predetermined frequency range during said portion of the individual engine combustion cycles, averaging means for averaging the frequencies of the resonant frequency peaks found for each individual cylinder for the prescribed number of engine cycles, classifying means for classifying each of the cylinders as at least low power and normal power cylinders on the basis of the averaged frequencies of the resonant frequency peaks found for each individual cylinder and the distribution thereof over all of the cylinders, and output means for issuing an identification of cylinders repeatedly classified as low power cylinders.

2. System for detection of low power in at least one cylinder of a multi-cylinder engine according to claim 1, wherein said vibration sensing means are mounted on an engine valve cover housing.

3. System for detection of low power in at least one cylinder of a multi-cylinder engine according to claim 2, wherein said vibration sensing means are piezoelectric knock sensors.

4. System for detection of low power in at least one cylinder of a multi-cylinder engine according to claim 1, wherein said vibrations sensing means are mounted on an engine cylinder block between adjacent head assemblies.

5. System for detection of low power in at least one cylinder of a multi-cylinder engine according to claim 4, wherein said vibration sensing means are piezoelectric knock sensors.

6. System for detection of low power in at least one cylinder of a multi-cylinder engine according to claim 1, wherein said vibration sensing means are piezoelectric knock sensors.

7. System for detection of low power in at least one cylinder of a multi-cylinder engine according to claim 1, wherein said predetermined frequency range is about 2,000–4,500 Hz and said defined portion of the combustion cycles is from top dead center to approximately 30° after top dead center during each power stroke.

8. System for detection of low power in at least one cylinder of a multi-cylinder engine according to claim 1, wherein said estimating means comprises means for performing fast fourier transformation on the output signals from the vibration sensing means, means for identifying a maximum magnitude frequency point and means for performing parabolic interpolation through the maximum magnitude frequency point and a frequency point at each side thereof to obtain a parabolic function, and means for determining a frequency at which the obtained parabolic function is maximized for use by said averaging means.

9. System for detection of low power in at least one cylinder of a multi-cylinder engine according to claim 8, wherein said vibration sensing means are piezoelectric knock sensing means.

10. System for detection of low power in at least one cylinder of a multi-cylinder engine according to claim 9, wherein said vibration sensors are mounted on an engine valve cover housing.

11. System for detection of low power in at least one cylinder of a multi-cylinder engine according to claim 9, wherein said vibration sensing means are mounted, on an engine cylinder block between adjacent head assemblies.

12. System for detection of low power in at least one cylinder of a multi-cylinder engine according to claim 1, further comprising diagnostic means for preventing false indications of low power cylinders by said output means due to failure of any of said vibration sensing means.

13. System for detection of low power in at least one cylinder of a multi-cylinder engine according to claim 12, wherein said diagnostic means comprises means for comparing redundant information provided by each of a plurality of said sensing means measuring the same jointly-monitored engine event.

14. System for detection of low power in at least one cylinder of a multi-cylinder engine according to claim 13, wherein said jointly-monitored engine event is closing of an engine intake/exhaust valve.

15. A method for detection of low power in at least one cylinder of a multi-cylinder engine comprising the steps of:
   A) detecting of vibration occurring during combustion in each of the individual cylinders of a multi-cylinder engine via vibration sensors and producing output signals corresponding to the amplitude and frequency thereof,
   B) limiting the output signals to a predetermined frequency range and from a defined portion of individual engine combustion cycles,
   C) detecting the existence of resonant frequency peaks occurring in the individual engine cylinders during each of a prescribed number of consecutive engine cycles,
   D) estimating the frequency of any resonant frequency peak detected in said predetermined frequency range during said portion of the individual engine combustion cycles,
   E) averaging the frequencies of the resonant frequency peaks found for each individual cylinder for the prescribed number of engine cycles,
   F) classifying each of the cylinders as at least low power and normal power cylinders on the basis of the averaged frequencies of the resonant frequency peaks found for each individual cylinder and the distribution thereof over all of the cylinders, and
   G) issuing an identification of cylinders repeatedly classified as low power cylinders.

16. A method for detection of low power in at least one cylinder of a multi-cylinder engine according to claim 15, wherein said estimating step includes the steps of performing fast fourier transformation on the output signals from the vibration sensors, identifying a maximum magnitude frequency point and performing parabolic interpolation through the maximum magnitude frequency point and a frequency point at each side thereof to obtain a parabolic function, and determining a frequency at which the obtained parabolic function is maximized for use by said averaging means.

17. A method for detection of low power in at least one cylinder of a multi-cylinder engine according to claim 16, wherein steps D–F comprise a sequence that is repeated a sufficiently large number of times to provide statistical accuracy prior to performance of step G.

18. A method for detection of low power in at least one cylinder of a multi-cylinder engine according to claim 17, wherein diagnostics are performed on the vibration sensors for preventing false indications of low power cylinders due to failure of any of said vibration sensors by comparing redundant information provided by each of a plurality of said sensors measuring the same jointly-monitored engine event, said diagnostics being performed after said sequence is repeated said sufficiently large number of times and prior to performance of step G.

19. System for detection of low power in at least one cylinder of a multi-cylinder engine according to claim 18, wherein said jointly-monitored engine event is closing of an engine intake/exhaust valve.

* * * * *